United States Patent
Adamson

(10) Patent No.: US 7,272,412 B2
(45) Date of Patent: Sep. 18, 2007

(54) MANAGING USER INTERFACE DATA ON WIRELESS DEVICES

(75) Inventor: Peter S. Adamson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 674 days.

(21) Appl. No.: 10/165,377

(22) Filed: Jun. 6, 2002

(65) Prior Publication Data

US 2003/0228888 A1    Dec. 11, 2003

(51) Int. Cl.
*H04M 1/00*    (2006.01)

(52) U.S. Cl. ............... 455/552.1; 455/566; 455/556.1; 455/556.2; 455/553.1

(58) Field of Classification Search ............ 455/41.1, 455/41.2, 552.1, 553.1, 556.1, 556.2, 566; 345/1.3, 2.1, 2.2, 2.3

See application file for complete search history.

(56) References Cited

U.S. PATENT DOCUMENTS

| | | | | |
|---|---|---|---|---|
| 5,983,073 A | * | 11/1999 | Ditzik | 455/11.1 |
| 6,768,911 B2 | * | 7/2004 | Hino et al. | 455/552.1 |
| 6,795,429 B1 | * | 9/2004 | Schuster et al. | 370/352 |
| 6,804,537 B1 | * | 10/2004 | Fujii | 455/557 |
| 6,828,986 B2 | * | 12/2004 | Sakashita et al. | 345/629 |
| 6,882,659 B1 | * | 4/2005 | Novak et al. | 370/466 |
| 2002/0035576 A1 | * | 3/2002 | Kishimoto et al. | 707/200 |
| 2002/0115478 A1 | * | 8/2002 | Fujisawa et al. | 455/567 |
| 2003/0105835 A1 | * | 6/2003 | Hori et al. | 709/219 |

* cited by examiner

*Primary Examiner*—Sanh D. Phu
(74) *Attorney, Agent, or Firm*—Fish & Richardson P.C.

(57) ABSTRACT

User interface data, from a central server, which define user options with respect to information stored at the central server may be managed by receiving the data at a wireless device. The wireless device may communicate some of the data to another wireless device that is in the vicinity of the first device. The later wireless device may display user options that are based on the user interface data.

37 Claims, 3 Drawing Sheets

MANAGING USER INTERFACE DATA ON WIRELESS DEVICES

TECHNICAL FIELD

This application relates to managing user interface data on wireless devices.

BACKGROUND

For example, when a user of a wireless telephone wants to listen to voice messages stored on a central server, information about his available messages and a menu of options may be presented to him by voice prompts provided by the server. The user navigates the voiced menu and makes his selections by speaking or by touching keys on the keypad of the telephone.

DESCRIPTION

Figure 1:
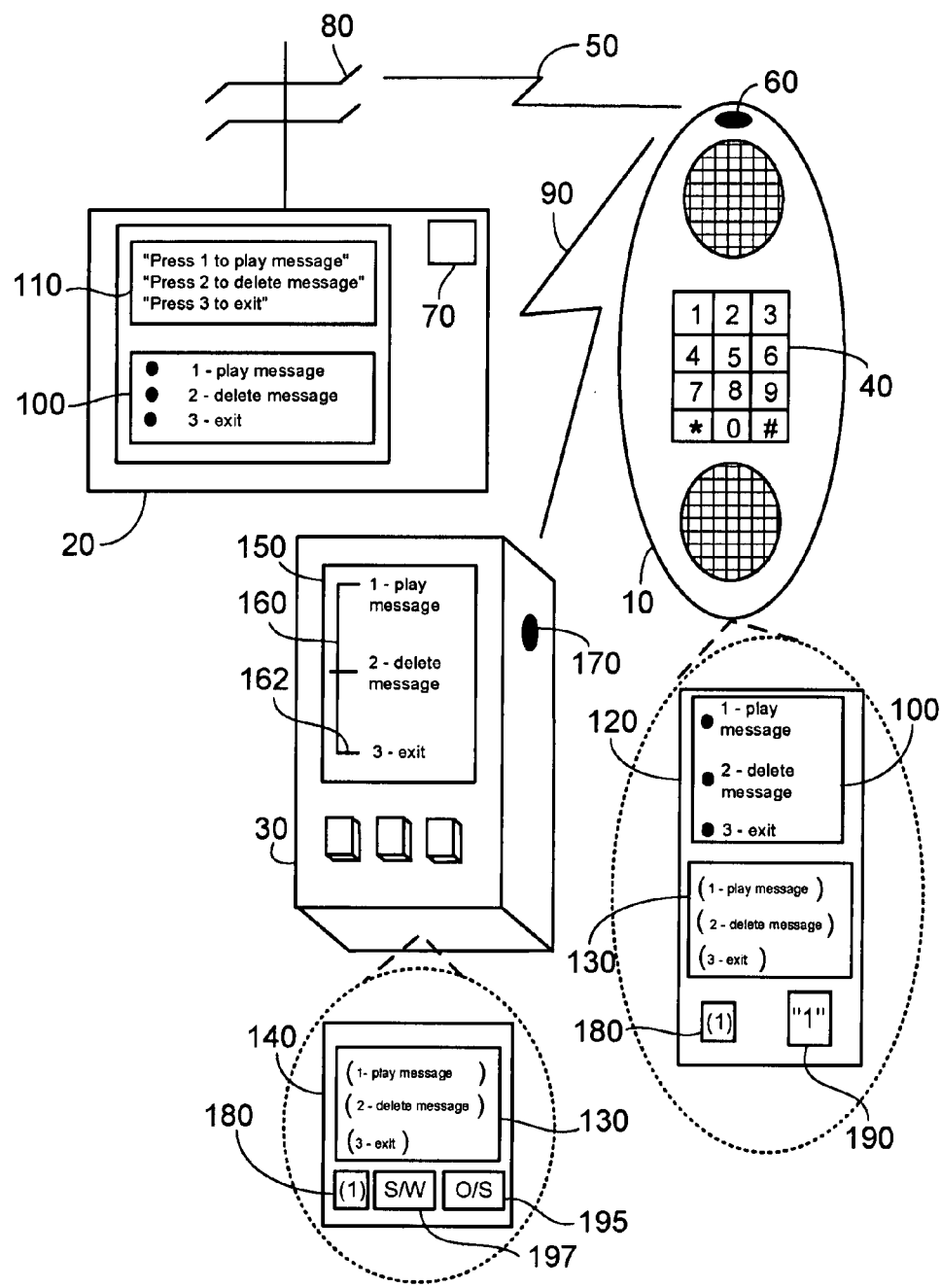
FIG. 1 shows a voicemail system, a cellular phone, and a personal digital assistant.

As shown in FIG. 1, in some implementations, a user of a cellular telephone (cell phone) 10 is able to view on a separate personal digital assistant (PDA) 30, a visual display of a decision tree 160 of options that represents a menu that would typically be conveyed by voice prompt from a voicemail system 20. The user can then make selections of branches 162 on the tree 160 by touching the display 150 of the PDA or by touching keys on the keypad 40 of the cell phone 10 or even by speaking selections back to the voice messaging system. Because he can view and navigate the menu easily on the PDA 30, the use of the voicemail system is made easier, quicker, and more convenient.

To achieve this result, in some implementations, voicemail menu data 100 stored on voicemail system 20 is downloaded to the cell phone 10 and then transmitted wirelessly to the PDA 30 for display. Selections may then be sent back to the cell phone, converted to standard dual-tone, multi-frequency (DTMF) signals corresponding to keystrokes, and returned to the voicemail system 20.

To initiate use of the system, the user of cell phone 10 may place a call to the voicemail system 20 or may receive a call from the voicemail system. To place a call, the user may use the keypad 40, included in the cell phone 10, to key in the appropriate phone number for the voicemail system 20. By placing a call, or receiving a call, a wireless communication link 50 is formed between a transceiver 60, also included in the cell phone 10, and, via an antenna 80, a transceiver 70 located at the voicemail system 20.

Once the link 50 is established, portions of a voice-activated menu 110 may be transmitted from the voicemail system 20 to the cell phone 10. Upon receiving the voice-activated menu 110, the cell phone 10 may attempt to form a second communication link 90 between the transceiver 60 and a transceiver 170 included in a nearby PDA 30. If the communication link 90 is successfully established, the cell phone 10 may download from the voicemail system 20 the voicemail menu data 100 corresponding to the entire voice-activated menu 110. Once the cell phone downloads the menu data, the menu data 100 may be stored in memory 120 in the cell phone 10.

Once the menu data 100 is stored in a memory 120 of the cell phone 10, the menu data may be converted into a format for uploading to the PDA 30. In one example, the cell phone may convert the menu data using an Object Exchange (OBEX) protocol. OBEX is a protocol which facilitates interoperability between devices such as the cell phone 10 and the PDA 30 and may convert the menu data 100 for efficient transferring between the two wireless digital devices. Once the menu data 100 is converted to an OBEX object 130, it may be uploaded, over the communication link 90, to the PDA 30. An operating system 195, also included in the memory 140 of the PDA, includes instructions to upload the OBEX object 130 and store the menu data object 130 in the memory 140.

Once in memory 140 the PDA 30 may process the menu data object 130 with software 197, also included in the memory 140, in order to display a text representation of the voice-activated menu 110 on the display 150 of the PDA 30. The menu 110 may be displayed, for example, as a decision tree 160 where the branches 162 of the tree represent the possible options of the voice-activated menu 110 from which the user may choose. By displaying the entire voice-activated menu 110, the user may quickly determine which branch 162 of the tree 160 represents his particular situation. The user may then select the branch of interest by, for example, pressing the section of the PDA display 150 showing the particular branch 162.

Once the user has selected the branch of interest, the PDA 30 may transmit a command to the cell phone 10 based on this selection. By selecting a branch 162 in the decision tree 160, PDA 30 may transmit for example, from the transceiver 170, a command to the cell phone 10 which corresponds to the particular decision selected.

For example, if the user presses the portion of the PDA display 150 corresponding to the "1—play message" branch, the PDA may store in memory 140 an OBEX object 180 corresponding to the a command for this selection. This command may transfer across the communication link 90 and be received by the transceiver 60 of the cell phone 10.

Upon receiving the command as an OBEX object 180, the cell phone 10 may map the command into a decimal number (or numbers) corresponding to a number or numbers that would have to be pressed in order to reach that particular portion of the voice-activated menu 110. In this example, the cell phone 10 would map the transferred OBEX object 180 into a DTMF signal 190 for use by the cell phone to denote that the "1" key on the keypad 40 has been pressed.

After the DTMF signal is generated, the signal may be placed on a radio frequency (RF) signal for transmission from the transceiver 60, of the cell phone 10, and over the communication link 50. The RF signal may then be received by the antenna 80, and the DTMF signal would be decoded by the transceiver 70. The command within the DTMF signal will instruct the voicemail system 20 which option was chosen by the user of the cell phone 10 and which options would now be appropriate for transmitting to the cell phone 10. This may prompt further options to be sent to the cell phone 10 causing other decision trees to be displayed on the PDA 30 or, for example, only one command transmission from the PDA 30 to the cell phone 10 is required and the voicemail system may play the message.

Figure 2:
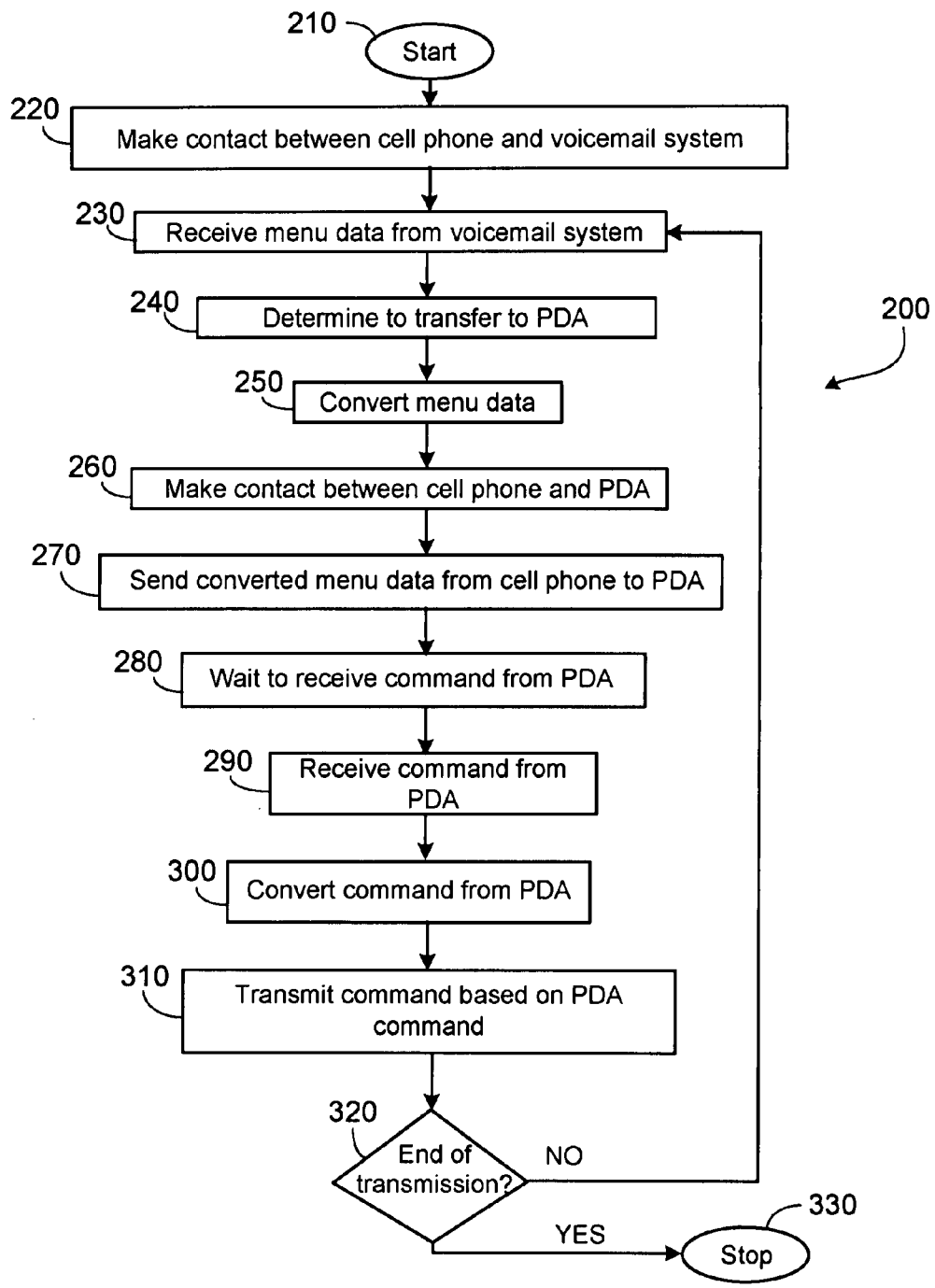
FIG. 2 shows a flow diagram of a voicemail menu data transferring procedure.

Referring to FIG. 2, a procedure (200) for transferring voicemail menu data between the voicemail system 20, the cell phone 10, and the PDA 30, in conjunction with FIG. 1, may start (210) when power is applied to the cell phone 10 and the PDA 30. After starting (210), and for example, as the user carries the cell phone 10 and the PDA 30, the procedure (200) waits for the cell phone 10 to make contact (220) with the voicemail system 20. As mentioned, contact may be established either by the user of the cell phone placing a call to the voicemail system 20 or by the cell phone 10 receiving a call from the voicemail system 20.

Once contact is established between the cell phone 10 and the voicemail system 20, procedure (200) next waits for voicemail menu data to be received (230) by the cell phone 10 from the voicemail system 20. Once the voicemail menu data has been received (230) by the cell phone 10, the procedure (200) determines (240) if PDA 30 is capable of receiving and utilizing the voicemail menu data. This determination may be based, for example, on the format of the voicemail menu data or, in another example, based on the characteristics of the communication link between the two wireless digital devices. Once the cell phone 10 determines (240) that the PDA is capable of receiving and displaying the voicemail menu data as, for example, in a decision tree display, the cell phone may convert (250) the menu data for transfer to the PDA 30.

The cell phone 10 may convert the voicemail menu data into an object of the OBEX protocol in order to efficiently transfer the voicemail menu data between the cell phone 10 and the PDA 30. After converting (250) the menu data into an OBEX object, the procedure (200) may next contact (260) the PDA 30 from the cell phone 10 and establish a communication link 90. In order to contact the PDA 30 the cell phone 10 may transmit a signal from the transceiver 60 and wait for a reply transmitted from the transceiver 170 of the PDA 30. Once the reply signal is decoded, the cell phone 10 may determine that the PDA is capable of receiving and processing the menu data.

Once contact (260) is established over the communication link, the procedure (200) next transmits (270) the voicemail menu data from the cell phone 10 to the PDA 30. Once the PDA 30 has received the voicemail menu data, the data is represented on the PDA's display 150 to allow the user to view all the menu options rather than having to listen, on the cell phone 10, as the voicemail system 20 reads each menu option to the user. Based on the menu data displayed, the user selects an option from the voicemail menu data and the PDA 30 transmits a command back to the cell phone 10 that corresponds to the selected option.

After the cell phone 10 transmits (270) the converted menu data to the PDA 30, the procedure (200) next waits (280) for the cell phone 10 to receive a command from the PDA 30. After the PDA sends the command, over the communication link, the cell phone 10 receives the command (290). After receiving the command (290), the procedure (200) decodes the command and converts the command (300) for transmitting from the cell phone 10 to the voicemail system 20. Once the command is converted (300), for example into a DTMF signal, the command is transmitted (310) to the voicemail system 20.

After the command is transmitted (310) to the voicemail system 20, procedure (200) determines whether to terminate (320) the communication link between the voicemail system 20 and the cell phone 10. This determination may be based on whether more menu options, which were not transmitted earlier, should be transmitted now from the voicemail system 20. The determination may also, for example, be based on whether user has decided to terminate the communication link without selecting more menu options. If the communication link is not terminated the procedure (200) returns to waiting to receive voicemail menu data (230) from the voicemail system 20 and to continue through the procedure (200). If the communication link is terminated then the procedure (200) ends (330).

Figure 3:
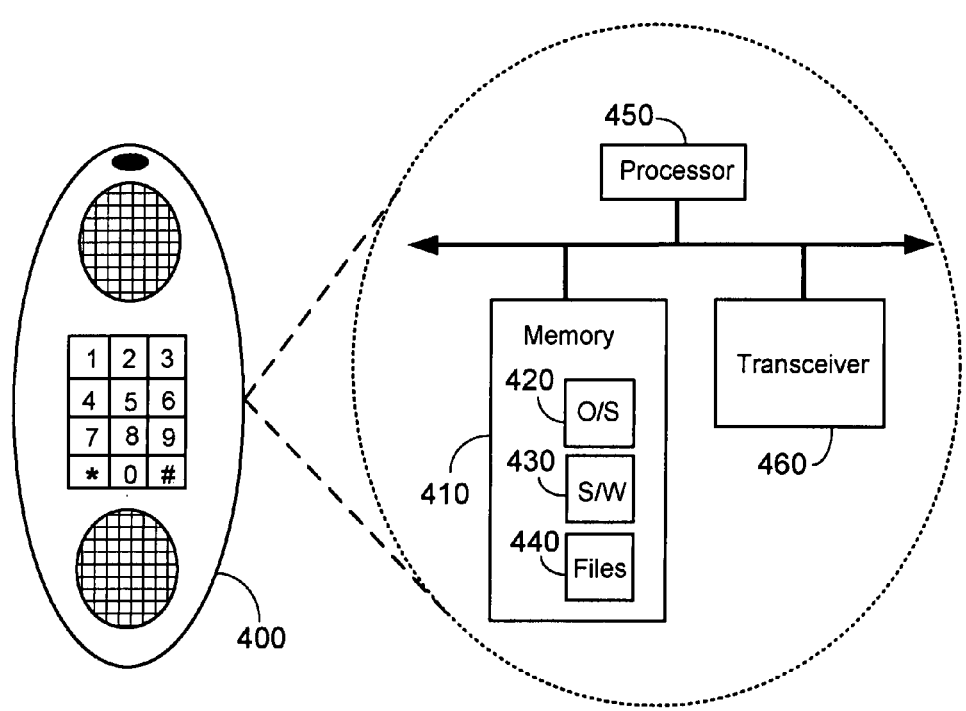
FIG. 3 shows a block diagram of a cellular telephone.

Referring to FIG. 3, a cell phone 400 includes a memory 410, which may store an operating system (O/S) 420 and software (S/W) 430 that may include instructions for procedure (200), described in conjunction with FIG. 2, and other functions described here. Memory 410 may also store files 440 that may contain voicemail menu data received from the voicemail system 20, in conjunction with FIG. 1, and may be transmitted the PDA 30. The files may also contain commands received from the PDA 30 for transmitting to the voicemail system 20. A processor 450 executes instructions, for example, the instructions of procedure (200) to transfer voicemail menu data and commands between the cell phone 400, PDA 30, and the voicemail system 20. Cell phone 400 also includes a transceiver 460 to transmit and receive RF signals encoded with the voicemail menu data and commands.

Other implementations are also within the scope of the following claims.

For example, in the implementation discussed in conjunction with FIG. 1, a cell phone 10 and a PDA 30 wirelessly transfer voicemail menu data and commands. However, other types of wireless devices may be used to transmit and receive voicemail menu data, voicemail menu commands, or other digital data with the voicemail system 20. For example, computers, pagers, wireless peripherals or other similar wireless devices may be used individually, or in combination, to transfer voicemail menu data and commands with the voicemail system 20.

Also in conjunction with FIG. 1, various central servers, besides the voicemail system 20, may transfer menu data and commands with the cell phone 10. For example, banking systems, media systems, entertainment systems or other similar central servers may transfer data and commands with the cell phone 10 and the PDA 30.

Also in conjunction with FIG. 1, various technologies may be implemented to establish communication links 50 and 90 between the cell phone 10, the PDA 30, and the voicemail system 20. Besides radio frequency (RF) signaling, infrared (IR) signaling, optical signaling, or other similar technologies may be used to implement communication links. RF signaling, IR signaling, optical signaling, or other similar signaling technologies may also be implemented individually or in combination to form the communication links for transferring the voicemail menu data and commands.

In the examples described above, voicemail menu data and commands were transferred, for example, between the voicemail system 20 and cell phone 10 and the cell phone and the PDA 30 as shown in FIG. 1. Other types of user interface data may also be transferred between these wireless devices. For example, streams of digital data, pictures, maps, individual digital bits, data files or other similar user interface data may be transferred between the wireless devices.

Cell phone 10 converted the voicemail data menu to an object of the OBEX protocol, in conjunction with FIG. 1 and FIG. 2, before transmitting the voicemail menu data to the PDA 30. However, the voicemail menu data and commands may undergo various conversions before being transferred between the cell phone and the PDA. For example, the voicemail menu data and commands may be encoded with an encryption for security. The digital data may also be encoded with an error correction scheme for reduce the bit transmission errors. Similarly, other conversions may be performed on the voicemail menu data and commands before transferring between the cell phone 10, the PDA 30, and the voicemail system 20. For example, in conjunction with FIGS. 1 and 2, the command selected on the PDA 30 was converted to an OBEX object 180 before transferring to the cell phone 10. The selected command may also, for example, be converted to an AT modem command, or other similar conversion, to control the cell phone 10 directly.

In conjunction with FIG. 1, voicemail menu data 100 may be transferred from the voicemail system 20 to the cell phone 10. The transferred menu data 100 may contain, for example, the entire voice-activated menu 110 from the voicemail system or a portion of the menu. If only a portion of the menu 110 is transferred to the cell phone, the remainder of the menu may be transferred to the cell phone after a command has been transferred from the PDA 30 to the cell phone 10 and then onto the voicemail system 20.

Also in conjunction with FIGS. 1 and 2, the voicemail system 20 may use various techniques to transfer data over the wireless communication link 50. For example, a short message service (SMS) may be established over the wireless communication link 50 between the voicemail system 20 and the cell phone 10. After a short message is received by the cell phone 10, from the SMS, a request may be sent from the cell phone to the voicemail system for more data. In another example, a multi-media message service (MMS) may be established over the communication link 50 and may completely transfer data, without further requests, from the voicemail system 20 to the cell phone 10. In these examples, the procedure (200) may be stored on the PDA 30 and the PDA may, for example, poll the cell phone 10 to determine whether to transfer data from the cell phone. After polling the cell phone 10, the PDA 30 may pull the SMS or MMS data from the cell phone for storing on the PDA.

Also in conjunction with FIG. 1, once the voicemail menu data 100 is transferred from the cell phone 10 to the PDA 30, the user may choose a menu option by selecting the option shown on the PDA 30 and having the PDA 30 transmit a command indicating the selection to the cell phone 10. However, the user may also view the menu options on the PDA's display 150, as just described, but enter the option selection onto the keypad 40 of the cell phone. By entering the selection on the keypad, the PDA 30 does not have to transmit commands thereby reducing bandwidth.

The transceiver 60, included in cell phone 10, and the transceiver 170, included in PDA 30, as shown in FIG. 1, may be separated into separate transmitters and receivers. By separating the two transceivers into individual units cost may be reduced while increasing electromagnetic isolation between the transmitters and the receivers.

The procedure (200), described in conjunction with FIG. 3, is not limited to any particular hardware or software configuration; it may find applicability in any computing or processing environment. Procedure (200) may be implemented in hardware, software, or any combination of the two. Procedure (200) may be implemented in computer programs executing on machines (e.g., programmable computers) that each include a processor, a machine-readable medium readable by the processor (including volatile and non-volatile memory and/or storage elements), at least one input device, and one or more output devices. Procedure (200) may also be implemented in an application specific integrated circuit (ASIC). Program code may be applied to the voicemail menu data, received by the cell phone 400, in conjunction with FIG. 3, to perform procedure (200) and to generate output information. The output information may be applied to one or more devices, such as the transceiver 460.

Each computer program may be implemented in a high-level procedural or object-oriented programming language to communicate with a computer system. However, the computer programs can be implemented in assembly or machine language, if desired. In any case, the language may be a compiled or interpreted language.

Each computer program may be stored on a machine-readable medium or device, e.g., random access memory (RAM), read only memory (ROM), compact disc read only memory (CD-ROM), hard disk drive, magnetic diskette, or similar medium or device, that is readable by a machine (e.g., a general or special purpose programmable computer) for configuring and operating the machine when the readable medium or device is read by the machine to perform procedure (200). Procedure (200) may also be implemented as a machine-readable storage medium, configured with a computer program, where, upon execution, instructions in the computer program cause the machine to operate in accordance with procedure (200).

Other embodiments are also within the scope of the following claims. For example, procedure (200) may operate upon starting the cell phone 400 and may execute continuously as the cell phone operates.

What is claimed is:

1. A method comprising:
   receiving, at a first portable wireless device, user interface data from a server, the user interface data defining user options with respect to information stored at the server;
   determining whether to transfer the user interface data from the first portable wireless device to a second portable wireless device based on the user interface data; and
   communicating at least some of the user interface data from the first portable wireless device to the second portable wireless device.

2. The method of claim 1, further comprising displaying user options that are based on the user interface data on the second portable wireless device.

3. The method of claim 1, further comprising,
   receiving, at the first portable wireless device, a user option selection from the second portable wireless device.

4. The method of claim 1, further comprising,
   converting at least some of the user interface data.

5. The method of claim 4, wherein the user interface data is converted by an OBEX protocol.

6. The method of claim 1 in which the information stored at the central server comprises a voice message.

7. The method of claim 6 in which the user options comprise at least one of playing the voice message and deleting the voice message.

8. A method comprising:
   receiving, at a portable wireless device, user interface data from a portable wireless phone in the vicinity of the portable wireless device, the user interface data defining user options with respect to voice messages stored at a central server; and
   displaying the user options on the portable wireless device based on the user interface data.

9. The method of claim 8, further comprising,
   selecting an option from the user options on the portable wireless device.

10. The method of claim 8, further comprising,
    transmitting an option of the user options from the portable wireless device to the portable wireless phone.

11. The method of claim 8, further comprising, converting an option from the user options on the portable wireless device.

12. The method of claim 11, wherein the option is converted by an OBEX protocol.

13. A portable wireless device comprising:
a processor to execute instructions; and
a memory storing instructions capable of causing the processor to,
receive user interface data from a central server, the user interface data defining user options with respect to information stored at the central server,
determine whether to transfer the user interface data from the portable wireless device to a second portable wireless device based on the user interface data, and
communicate at least some of the user interface data from the portable wireless device to the second portable wireless device in the vicinity of the portable wireless device for display of user options that are based on the user interface data.

14. The portable wireless device of claim 13, wherein the instructions include causing the processor to receive a user option selection from the second portable wireless device.

15. The portable wireless device of claim 13, wherein the instructions include causing the processor to convert at least some of the user interface data.

16. The portable wireless device of claim 15, wherein the user interface data is converted by an OBEX protocol.

17. A portable wireless device comprising:
a processor to execute instructions; and
a memory storing instructions capable of causing the processor to,
receive user interface data from a portable wireless phone in the vicinity of the portable wireless device, the user interface data defining user options with respect to voice messages stored at a central server, and
display the user options based on the user interface data.

18. The portable wireless device of claim 17, wherein the instructions includes causing the processor to select an option from the user options.

19. The portable wireless device of claim 17, wherein the instructions include causing the processor to transmit an option from the user options to the portable wireless phone.

20. The portable wireless device of claim 17, wherein the instructions include causing the processor to convert an option from the user options.

21. The portable wireless device of claim 20, wherein the option is converted by an OBEX protocol.

22. An article comprising a machine-readable medium that stores instructions capable of causing a portable wireless device to:
receive user interface data from a central server, the user interface data defining user options with respect to information stored at the central server;
determine whether to transfer the user interface data from the portable wireless device to a second portable wireless device based on the user interface data; and
communicate at least some of the user interface data to the second portable wireless device in the vicinity of the portable wireless device for display at the second portable wireless device of user options that are based on the user interface data.

23. The article of claim 22, wherein the instructions are further capable of causing the portable wireless device to receive a user option selection from the second portable wireless device.

24. The article of claim 22, wherein the instructions are further capable of causing the portable wireless device to convert at least some of the user interface data.

25. The article of claim 24, wherein the user interface data is converted by an OBEX protocol.

26. A system comprising:
a portable wireless phone configured to receive user interface data from a central server, the user interface data defining user options with respect to voice messages stored at the central server; and
a portable wireless device in the vicinity of the portable wireless phone configured to receive at least some of the user interface data from the portable wireless phone for display at the portable wireless device of user options that are based on the user interface data.

27. The system of claim 26, wherein the wireless phone determines whether to transfer the user interface data from the wireless phone to the wireless device based on the user interface data.

28. The system of claim 26, wherein the wireless phone receives a user option selection from the wireless device.

29. A method comprising:
receiving, at a first wireless device, user interface data from a central server, the user interface data defining user options with respect to information stored at the central server; and
communicating at least some of the user interface data from the first wireless device wirelessly to a second wireless device in the vicinity of the first wireless device for display at the second wireless device of user options that are based on the user interface data;
wherein the user options are selectable through both the first and second wireless devices.

30. The method of claim 29, further comprising, determining whether to transfer the user interface data from the first wireless device to the second wireless device based on the user interface data.

31. The method of claim 29, further comprising converting at least some of the user interface data using an OBEX protocol.

32. The method of claim 29 in which each user option is selectable by a key on the first wireless device.

33. The method of claim 29 in which each user option is selectable by a spoken word that is received at the first wireless device.

34. The method of claim 29, further comprising sending a dual-tone multi-frequency (DTMF) signal from the first wireless device to the central server, the DTMF signal representing the user option selection.

35. A method comprising:
receiving, at a first device, user interface data from a central server, the user interface data defining user options with respect to information stored at the central server;
determining whether to transfer at least some of the user interface data from the first device wirelessly to a second device in the vicinity of the first device based on the user interface data; and
communicating the at least some of the user interface data from the first device wirelessly to the second device for display at the second device of user options that are based on the user interface data.

36. The method of claim 35 wherein the user options are selectable through both the first and second devices.

37. A method comprising:

receiving, at a device, user interface data from a phone in the vicinity of the device through a wireless communication link, the user interface data defining user options with respect to voice messages stored at a central server;

converting an option from the user options on the device by an OBEX protocol; and displaying the user options on the device based on the user interface data.

* * * * *